United States Patent
Powell et al.

(10) Patent No.: US 8,085,200 B2
(45) Date of Patent: Dec. 27, 2011

(54) SYSTEM AND METHOD FOR ESTABLISHING A WPAN WITH PRECISE LOCATIONING CAPABILITY

(75) Inventors: Clinton C Powell, Chandler, AZ (US); Kuor-Hsin Chang, Sunnyvale, CA (US); Shahin Farahani, Scottsdale, AZ (US); Jon T. Adams, Scottsdale, AZ (US); Matthew L. Welborn, Cary, NC (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 12/141,213

(22) Filed: Jun. 18, 2008

(65) Prior Publication Data

US 2009/0315778 A1 Dec. 24, 2009

(51) Int. Cl.
*G01S 3/02* (2006.01)
(52) U.S. Cl. ........................................ 342/463
(58) Field of Classification Search .............. 342/450, 342/457, 463–465; 455/456.2, 456.6, 457
See application file for complete search history.

(56) References Cited

U.S. PATENT DOCUMENTS

| | | | |
|---|---|---|---|
| 6,473,038 B2 | 10/2002 | Patwari et al. | |
| 6,735,238 B1 | 5/2004 | McCorkle | |
| 6,748,324 B2 | 6/2004 | Patwari et al. | |
| 6,853,445 B2 | 2/2005 | Perkins et al. | |
| 6,865,347 B2 | 3/2005 | Perkins et al. | |
| 6,931,078 B2 | 8/2005 | McCorkle et al. | |
| 6,954,446 B2 | 10/2005 | Kuffner | |
| 7,030,761 B2 | 4/2006 | Bridgelall et al. | |
| 2003/0067889 A1* | 4/2003 | Petite | 370/310 |
| 2004/0233858 A1 | 11/2004 | Karaoguz | |
| 2005/0052318 A1* | 3/2005 | Jendbro et al. | 342/357.1 |
| 2005/0282558 A1 | 12/2005 | Choi et al. | |
| 2006/0163349 A1* | 7/2006 | Neugebauer | 235/383 |

OTHER PUBLICATIONS

International Application No. PCT/US2009/038778 Search Report and Written Opinion, dated Oct. 29, 2009.

* cited by examiner

*Primary Examiner* — Dao Phan
(74) *Attorney, Agent, or Firm* — Hamilton & Terrile, LLP; Gary W. Hamilton

(57) ABSTRACT

A system and method is provided for determining the location of an object. A first transceiver is associated with an object to be located. The first transceiver comprises a first transmitter and a first receiver operable to transmit and receive signals using a first transmission protocol and a second transmitter operable to transmit signals using a second transmission protocol. A first signal is transmitted using the first signal transmission protocol and is received by the first receiver. The second transmitter is then used to transmit a second signal using the second transmission protocol in response to receipt of the first signal and the second signal is then processed to determine the location of the object. In some embodiments, the first transmission protocol is in accordance with the Institute of Electrical and Electronics Engineers (IEEE) 802.15.4 standard and the second transmission protocol is in accordance with a Ultra-Wide Band (UWB) standard.

20 Claims, 5 Drawing Sheets

US 8,085,200 B2

SYSTEM AND METHOD FOR ESTABLISHING A WPAN WITH PRECISE LOCATIONING CAPABILITY

BACKGROUND OF THE INVENTION

1. Field of the Invention

The present invention relates in general to the field of wireless telecommunications and, more specifically, to a system and method for using plural wireless telecommunications systems to provide accurate position information.

2. Description of the Related Art

Ultra Wide Band (UWB) short-range wireless networks are capable of communicating at very high data rates and, due to UWB's pulse-based protocol, can be used to precisely estimate the range between different objects and, therefore, can be used to determine the location of objects. However, locationing systems utilizing only UWB signals are costly, in terms of both power and size, when compared to systems based on the Institute of Electrical and Electronics Engineers (IEEE) 802.15.4 standard. Systems based on the IEEE 802.15.4 standard, provide extremely low power consumption, low data rate, and low cost (complexity) wireless networking and is capable of providing location estimation with 2 to 3 meters accuracy using Received Signal Strength Indicator (RSSI) methods. Additionally, the location techniques employed on IEEE 802.15.4 networks require a much higher fixed node density because of the comparatively low average coverage range when using IEEE 802.15.4 devices for locationing, which results in higher systems costs. Accuracy using IEEE 802.15.4 devices is reduced significantly when the fixed node separation is greater than 10 meters and is unusable in situations where it is necessary to penetrate walls.

UWB technology can provide precise ranging between objects and has been used in numerous applications, such as asset tracking. UWB systems use a pulse-mode transmitter, which generates and transmits a pulse. The UWB transmitter is significantly smaller in die area and simpler than the UWB receiver and consumes far less power. For example, in a UWB transceiver, the transmitter portion may account for less than two percent of the total die area and may consume less than one percent of the overall power consumption. The UWB receiver, in contrast, is more complicated, is much larger in area, and consumes much more power.

In view of the foregoing, is it apparent that there is a need for a method and system for a cooperative IEEE-802.15.4/UWB system to combine the advantages of both systems to provide a low-cost and low-power precise locationing system.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
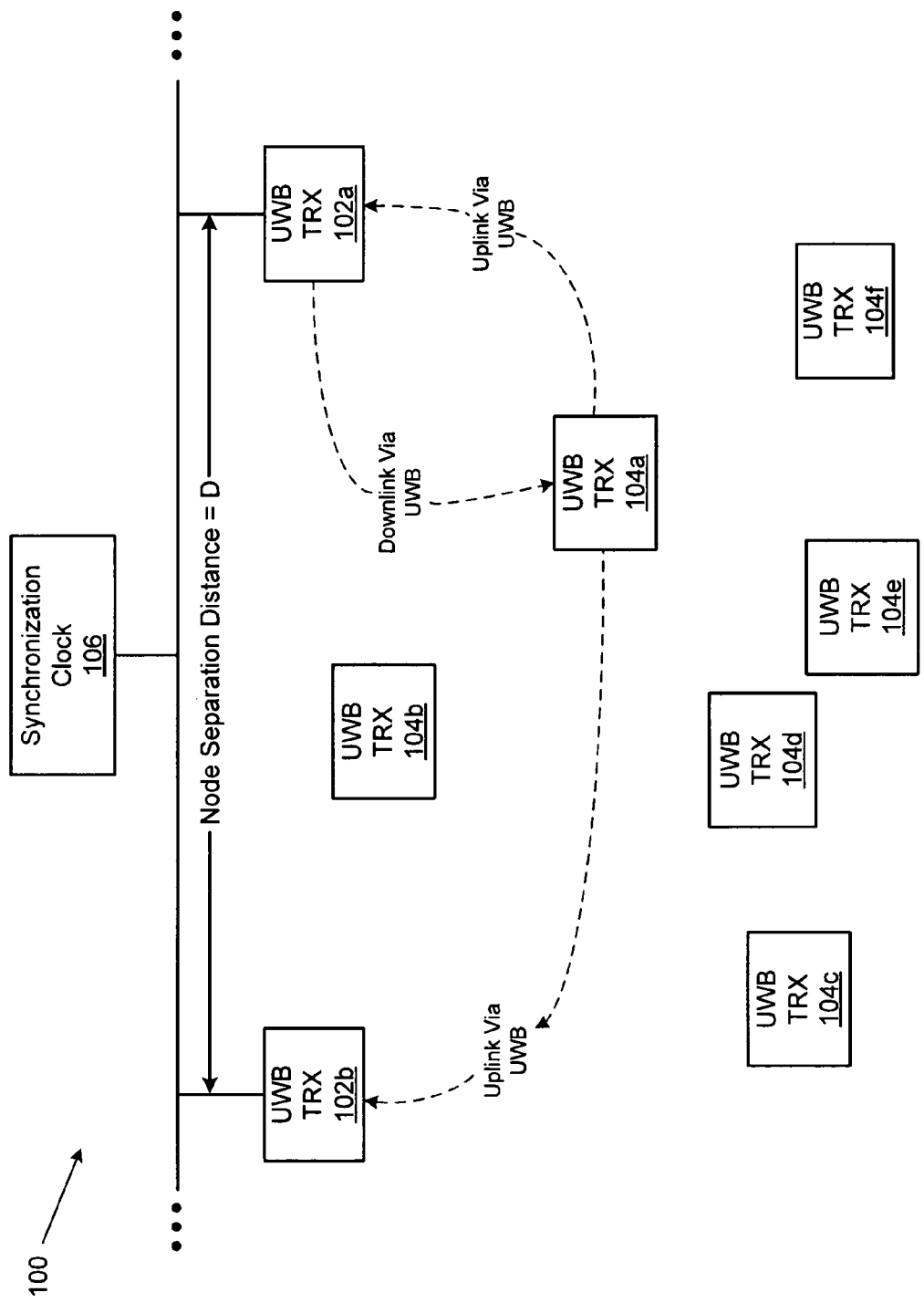
FIG. 1 is an illustration of a UWB-based tracking system.

Embodiments of components are described for providing a cooperative IEEE-802.15.4/UWB positioning system. By combining system components operating in accordance with the IEEE-802.15.4 with UWB system components, the cooperative system described herein overcomes the disadvantages of each of the systems, while maintaining the advantages of both. Embodiments of the invention also provide reduced-function nodes (RFNs) that allow the Smart/Active RF Tags to be lower in complexity, cost, and current drain, thereby providing the avenue for greater deployment and adoption.

As will be appreciated by those of skill in the art, IEEE 802.15.4 is a standard which specifies the physical layer and medium access control (MAC) for low-rate wireless personal area networks (LR-WPAN's). The IEEE 802.15.4 standard was initially ratified in 2003 and has been reissued with several subsequent amendments. The IEEE 802.15.4-2006 standard was a complete revision of IEEE 802.15.4-2003 standard. This revision included changes to the MAC and Security and added optional sub-one-gigahertz PHY's. The IEEE 802.15.4a-2007 standard was an amendment to IEEE 802.15.4-2006 standard. This amendment provides higher data rates by adding alternate PHY's to support precise ranging, increased range and more robustness. This revision defines one direct-sequence spread spectrum (DSSS) PHY and one Chirp (UWB) PHY for different communication modes. The IEEE 802.15.4a-2007 standard is a derivative of the original IEEE 802.15.3a proposals. The IEEE 802.15.3a standard was directed generally to short-range, high-data rate applications, while the IEEE 802.15.4a-2007 standard is directed generally to ranging-related applications. There are three DSSS/UWB bands specified in IEEE 802.15.4a-2007 amendment: 250-750 MHz; 3.1-4.8 GHz, and 5.1-10.6 GHz. Embodiments of the invention described herein are compatible with all of the versions of the IEEE 802.15.4 standard discussed above.

UWB is a technology for transmitting information spread over a large bandwidth. Embodiments of the invention described herein utilize pulse-based UWB systems, wherein each transmitted pulse instantaneously occupies a large fraction of the allocated UWB bandwidth. There are two approaches for UWB systems proposed by the IEEE 802.15 TG3a task group (now disbanded). One approach is an MBOA (Multiband OFDM Alliance) approach which is OFDM based. MBOA is now part of the WiMedia Alliance. MBOA has a provided specification so companies producing integrated circuits, platforms, and systems using the MBOA approach can claim to be compliant with the MBOA specification. A second UWB approach using DSSS techniques was proposed by the UWB Forum (now disbanded) using DSSS based techniques. Those producing integrated circuits, platforms, and systems using the DSSS or Chirp as defined in the IEEE 802.15.4 a-2007 amendment can also claim to be compliant. Embodiments of the invention as described herein can be adapted to be compatible with any of the UWB approaches discussed above.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified drawings in order to avoid limiting or obscuring the present invention. Such descriptions and representations are used by those skilled in the art to describe and convey the substance of their work to others skilled in the art. Various illustrative embodiments of the present invention will now be described in detail with reference to the figures.

FIG. 1 shows a UWB-based tracking system 100 comprising fixed nodes 102a-b and a plurality of mobile nodes 104a-f. A synchronization clock 106 is operable to generate a synchronization clock signal that is used to calculate the positions of the respective mobile nodes using techniques known to those of skill in the art. For example positions of the respective nodes can be calculated using techniques described in "Locationing in Distributed Wireless Ad-Hoc Networks," C. Savarese, et. al., ICASSP, May, 2001, which by this reference is incorporated for all purposes. The fixed nodes generally have a main power supply connection and, therefore, their power consumption is not an issue. The mobile nodes associated with tracked objects are normally powered only by a battery and, therefore, it is desirable to keep their power consumption to a minimum. Any of the individual mobile nodes 104a-f may communicate with the fixed nodes 102a-b regarding its location and also may transfer and receive other types of data (e.g., battery status, sensory information, etc.) as well as act upon commands received from the network. Depending on the usage, both the mobile nodes 104a-f and the fixed nodes 102a-b may have both receive and transmit UWB capabilities.

Figure 2:
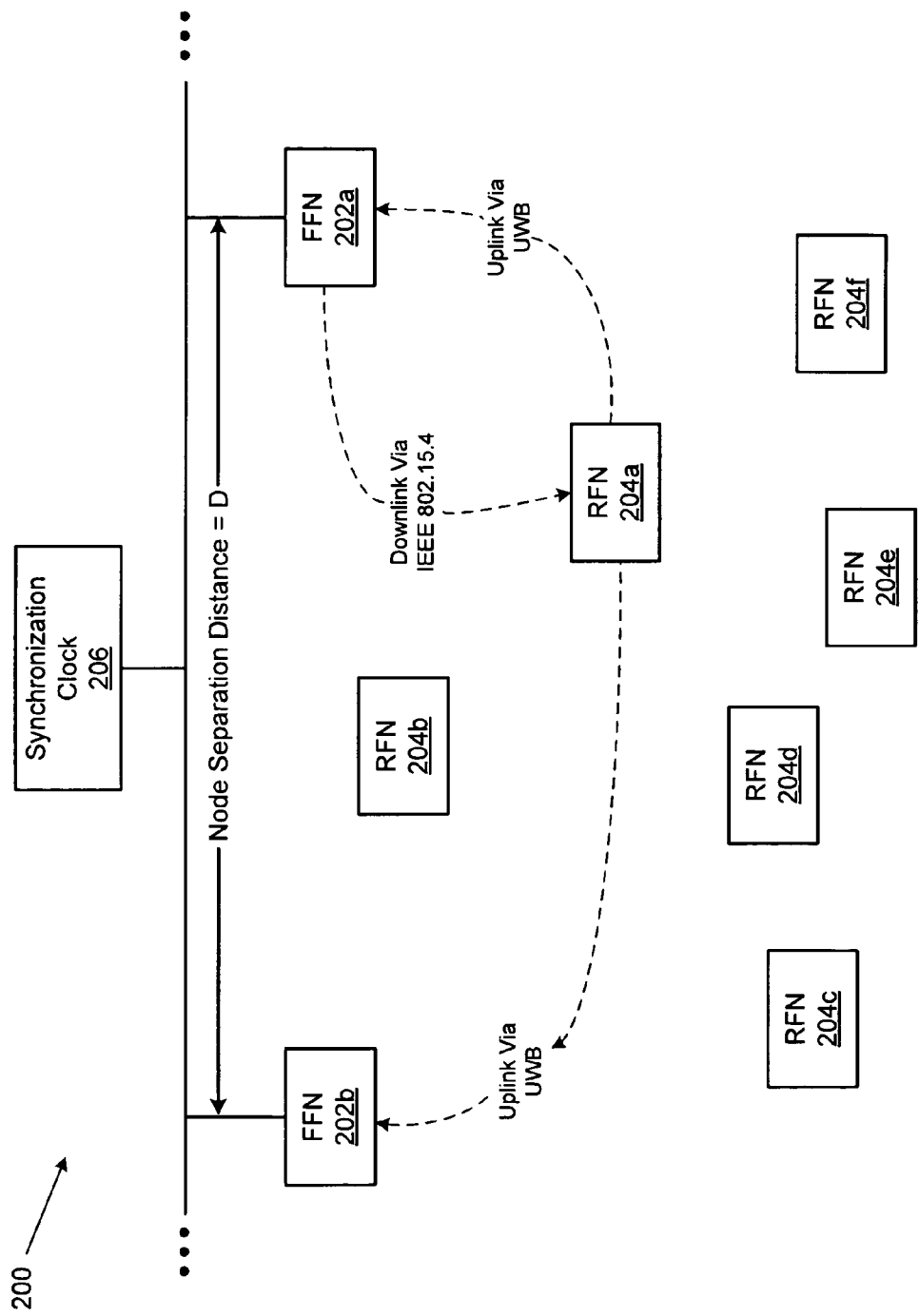
FIG. 2 is an illustration of a cooperative IEEE-802.15.4/UWB positioning system in accordance with an embodiment of the invention.
Figure 3:
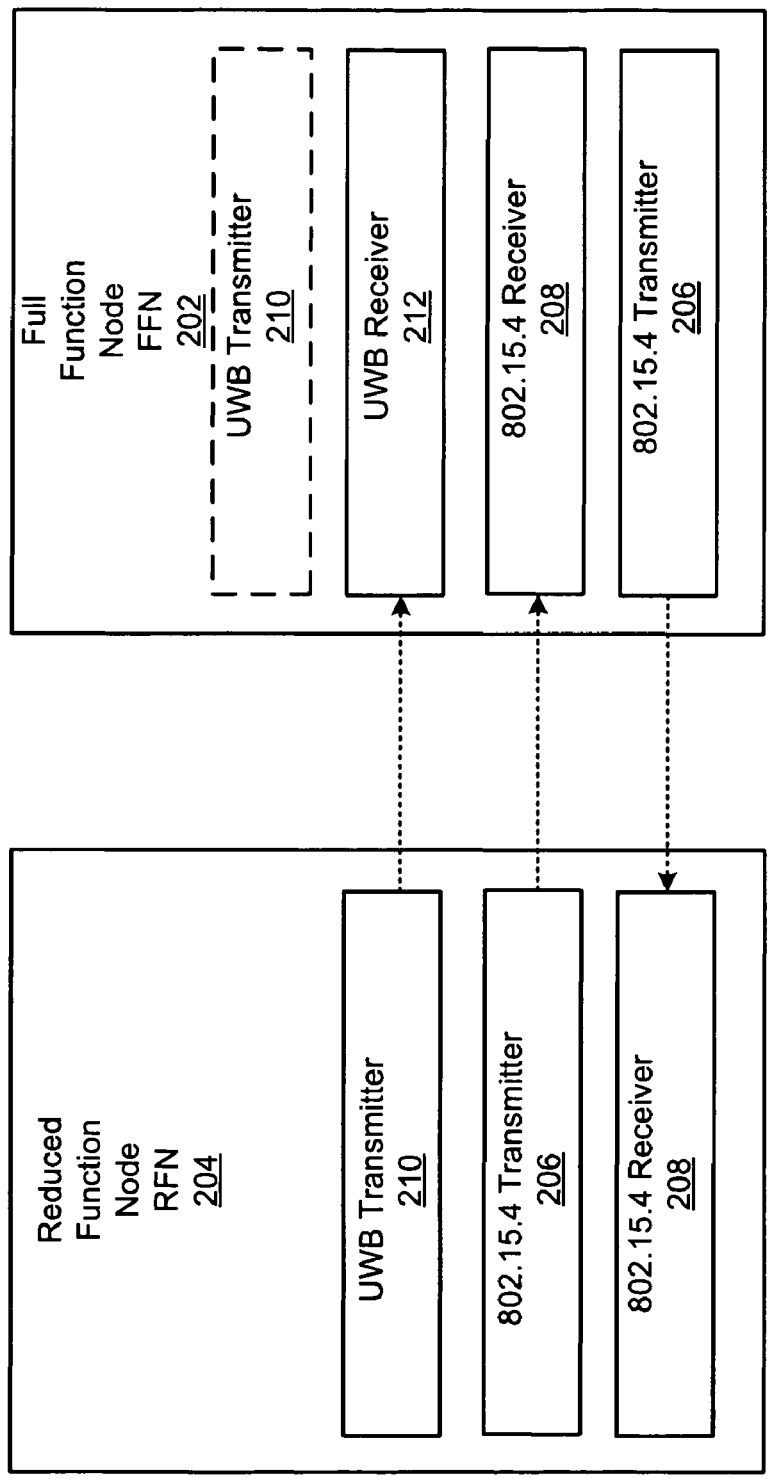
FIG. 3 is an illustration of a full-function node and a reduced function node used in a cooperative IEEE-802.15.4/UWB positioning system.

FIG. 2 is an illustration of a communication system 200 in accordance with embodiments of the invention for a cooperative IEEE 802.15.4/UWB locationing system. The communication system 200 comprises a plurality of fixed full-function nodes (FFN) 202a-b and a plurality of reduced-function nodes (RFN) 204a-f. Referring to FIG. 3, each FFN and RFN comprises an IEEE 802.15.4 transmitter 206 and receiver 208. The RFN 204 further comprises a UWB transmitter 210. The FFN 202 further comprises a UWB receiver 212 and, optionally, a UWB transmitter 210, but it is not necessary for the FFN 202 to have UWB transmit capability. Because the UWB transmitter requires a very small amount of die area, it is possible to combine the UWB transmitter 210 path on the same die with IEEE 802.15.4 transmitter 206 and receiver 208.

Referring again to the cooperative IEEE 802.15.4/UWB locationing system shown in FIG. 2, the FFNs 202a and 202b may have fixed, known locations and are provided with a synchronization signal generated by synchronization clock 206. The RFNs 204a-f are positioned at arbitrary locations. When there is a request to determine the location of a particular RFN, the network transmits a location request command via a FFN, e.g., FFN 202a, using a IEEE 802.15.4 downlink and uses the IEEE 802.15.4 MAC address of the desired RFN node, e.g., RFN 204a, as part of the data payload to identify the specific RFN. The FFNs 202a-b then listen, using their UWB receivers, for a transmitted UWB response from the RFN. Assuming successful reception of the location request command, the corresponding RFN, e.g., RFN 204a, will then send a UWB signal back which will be received by all designated FFNs, e.g., FFNs 202a-b in the radio range of the RFN.

If the network does not receive a response back from the corresponding RFN, there are two options: The first option is to rebroadcast the location request command assuming that RFN is in the radio range of the network. The second option is to use a FFN in a physically different location to send the location request command. This FFN can be selected from a "search profile" that determines the order in which FFNs will be sending the location request command.

Figure 4:
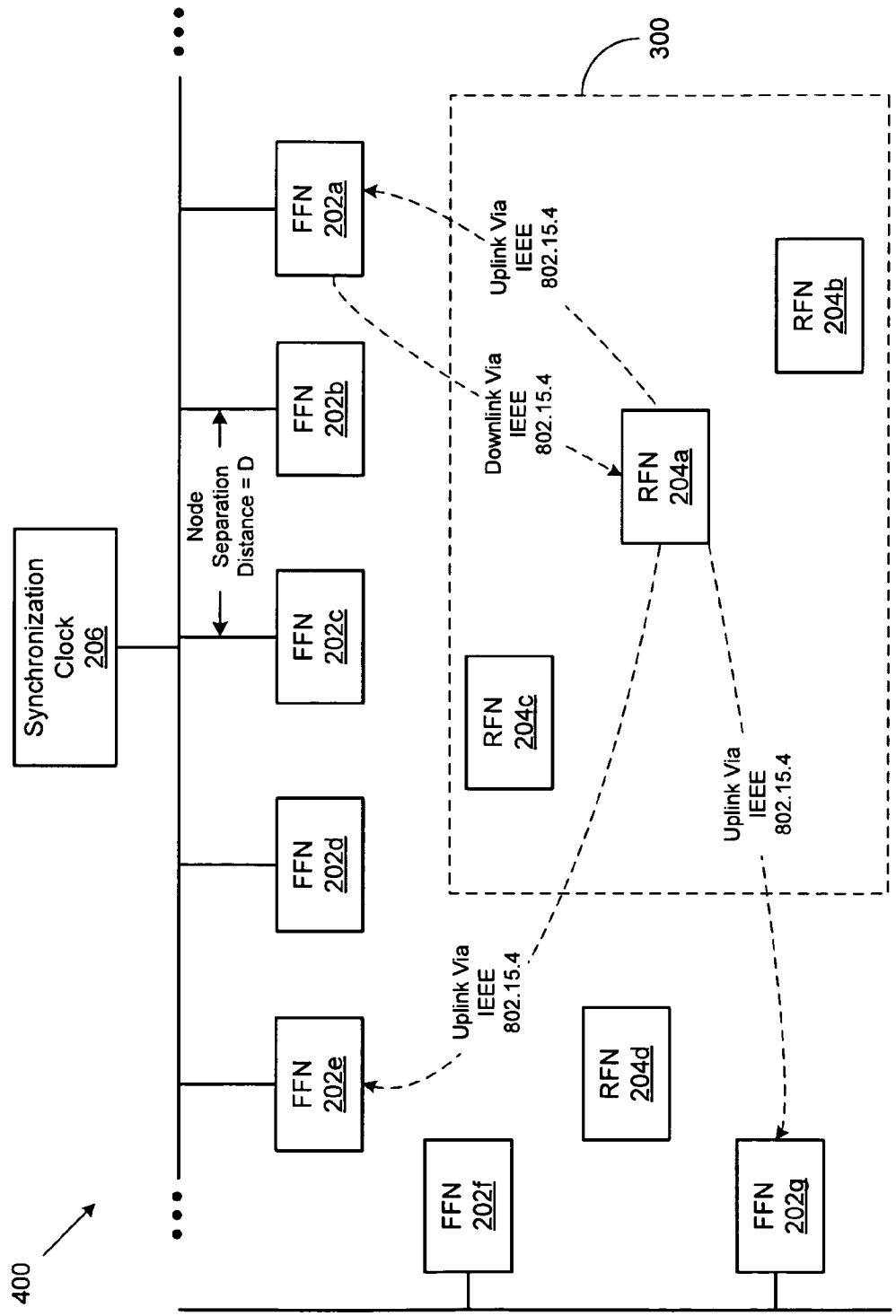
FIG. 4 is an illustration of an extended-range cooperative IEEE-802.15.4/UWB position system in accordance with an embodiment of the invention.

FIG. 4 is an illustration of a communication system 400 for using IEEE 802.15.4 and UWB to provide a cooperative low power extended range approximate locationing in an extended zone 300. As will be understood by those of skill in the art, a UWB-based locationing system has much more precise ranging and location accuracy; however, the effective range is less than that of a system using 802.15.4 devices. Local regulations normally do not allow an increase in UWB transmitter signal power to improve link performance. IEEE 802.15.4 transceivers, on the other hand, can cover 100 meters or more. The method and system shown in FIG. 4 allows precise locationing when the object is close to UWB receivers and provides an approximate location with 2-3 meters accuracy when the object is outside the UWB range.

In the system shown in FIG. 4, a plurality of FFNs 202a-g have fixed locations and are provided with a synchronization signal generated by a synchronization clock 206. A plurality of RFNs 204a-d are positioned at arbitrary locations. In situations where the FFNs 202a-g cannot receive an RFN transmission through the UWB uplink, as illustrated by RFNs 202a-c in extended zone 300, or in situations where it is only necessary to know the approximate location of an RFN, the network transmits a location request using 802.15.4 commands. For example, an 802.15.4 command can be transmitted from a selected FFN, e.g. FFN 202a, via the FFN's IEEE 802.15.4 downlink, using the MAC address of the desired RFN node as part of the data payload. The plurality of the FFNs 202a-g operate in IEEE 802.15.4 receive mode to listen for a response from the targeted RFN. Assuming successful receive of the location request command, the targeted RFN 204a will send an IEEE 802.15.4 signal, contingent to a successful CCA (Clear Channel Assessment), which will be received by the designated FFNs in the radio range of the RFN 204a. As will be understood by those of skill in the art, the approximate location of the RFN 204a can be calculated using algorithms that calculate the delay of received data to different FFNs.

If a response is not received from the targeted RFN 204a, there are multiple options for the network to obtain the desired tracking information. The first option is to repeat the location request command, assuming that the targeted RFN for some reason missed the initial transmission. The second option is to use another FFN, e.g. 204b to send the location request command. The FFN 204b, or another FFN, may be selected from a "search profile" that determines the order in which FFNs will be sending the location request command.

Figure 5:
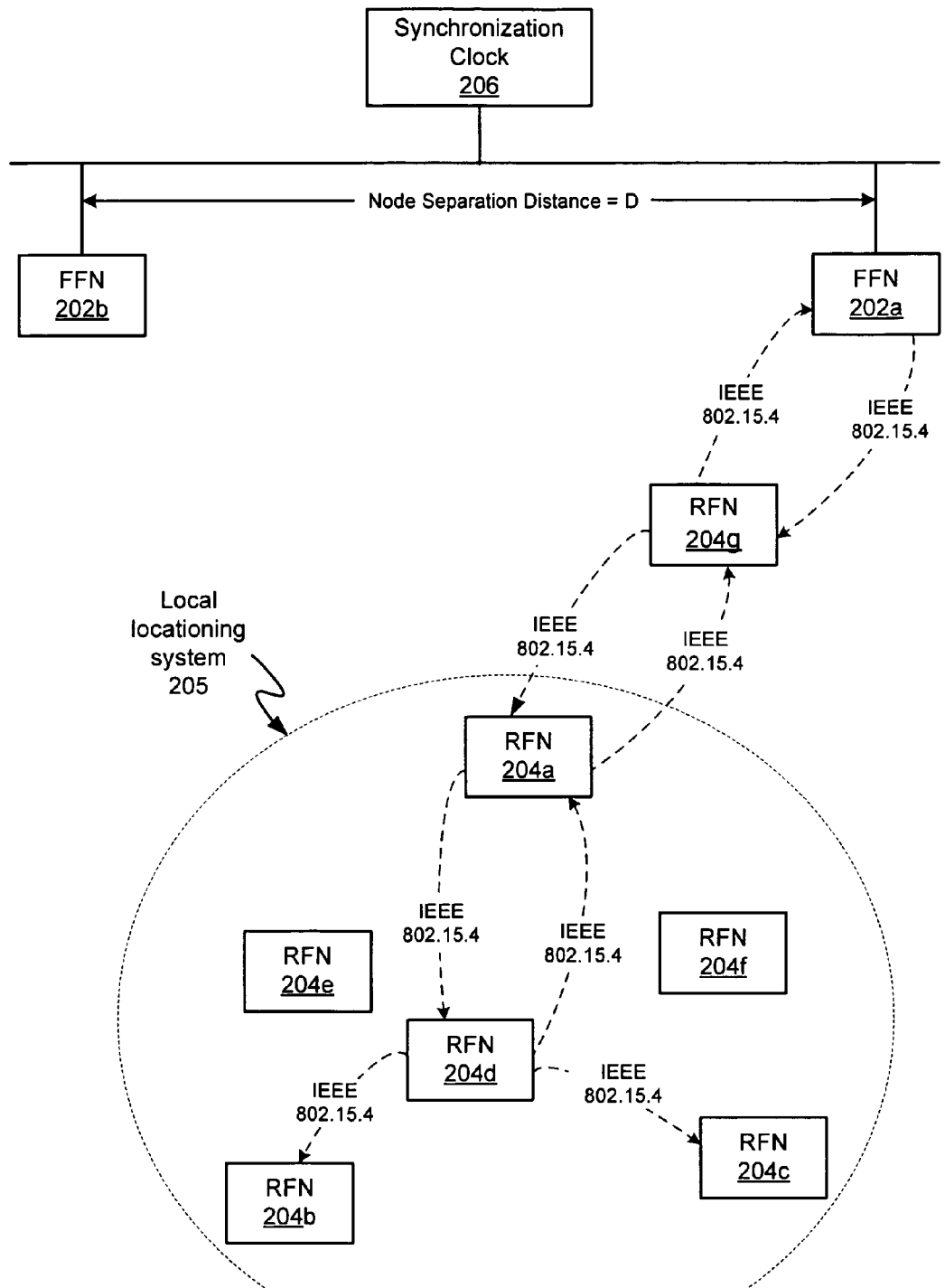
FIG. 5 is an illustration of an extended range IEEE-802.15.4 positioning system in accordance with an embodiment of the invention.

FIG. 5 is an illustration of a local locationing system 205 comprising only RFN devices using local IEEE 802.15.4 data links. The system shown in FIG. 5 can be used to provide locationing information using the following sequence:

Step 1: Using the cooperative IEEE 802.15.4/UWB algorithm discussed above, precise or estimated location of at least three RFN nodes are determined and communicated back to the local RFN. For example, in FIG. 5, the location of RFN 204a, RFN 204b, and RFN 204c are determined and communicated to RFN 204g.

Step 2: RFN 204a, RFN 204b, and RFN 204c provide an approximate location mechanism based on any existing algorithms known in the art and can track the approximate location of other RFNs within their radio range. For example, in FIG. 5, the location of RFN 204*d* can be determined relative to RFN 204*a*, RFN 204*b*, and RFN 204*c*. RFN 204*a* can transmit positioning information to the network when any of the following events occur: 1) the network requests the positioning data; 2) an internal timer or beacon generates a transmit signal causing RFN 204*a* to transmit the positioning data at a predetermined time; or 3) a pre-determined event occurs; e.g., an RFN leaving a certain area or two RFNs coming too close to each other.

When an RFN is leaving a precise locationing area (i.e., an area wherein both IEEE 802.15.4 and UWB data links are available), the system is operable to seamlessly switch to the approximate locationing protocol and when the RFN is again within range of at least one FFN's UWB receiver, the system is operable to switch back to precise locationing.

Those of skill in the art will appreciate that there are times when the system may not be able to determine even an approximate location of an RFN; nonetheless, the system can determine relative location of an RFN to other RFNs. This data is still useful. For example, the system may raise an alarm if certain RFNs are too close to each other or if the system cannot locate an RFN at all.

Those of skill in the art will appreciate that embodiments of the invention as described herein provide a method and system for cooperation of two wireless networking methods in one WPAN tracking system that results in lower overall power consumption, lower non-fixed node cost and lower fixed node density, while maintaining the precise locationing accuracy and providing for system scalability of the locationing. The system and method described herein takes advantage of the IEEE 802.15.4 transceiver's native, efficient power consumption instead of UWB, whenever possible, for the communications between the fixed nodes (FFN) and the tracked-nodes (RFN). The system and method described herein also reduces the implementation cost of tracked nodes (RFNs) by integrating only the UWB transmitter with a power efficient and cost-effective IEEE 802.15.4 transceiver.

Embodiments of the invention provide a stable means to interface between the locationing system and any other IEEE 802.15.4-based network by using the IEEE 802.15.4 physical layer (PHY) and Media Access Control (MAC). The system and method described herein also provides increased locationing range by dividing the area to two sections: a first section that is close to fixed nodes (FFNs) where precise locationing is possible, and a second section comprising an extended range area where approximate locationing is enabled, thereby providing system scalability.

Although the described exemplary embodiments disclosed herein are directed to various examples of an improved system and method for providing accurate position and locationing information, the present invention is not necessarily limited to the example embodiments. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for determining the location of an object, comprising:
    associating a first transceiver with an object to be located, said first transceiver comprising a first transmitter and a first receiver operable to transmit and receive signals using a first transmission protocol and a second transmitter operable to transmit signals using a second transmission protocol;
    transmitting a first signal using said first transmission protocol;
    using said first receiver to receive said first signal;
    using said second transmitter to transmit a second signal using said second transmission protocol in response to receipt of said first signal; and
    processing said second signal to determine the location of said object.

2. The method of claim 1, wherein said first transmission protocol is an IEEE 802.15.4 transmission protocol.

3. The method of claim 1, wherein said second transmission protocol is compliant with an Ultra Wide Band (UWB) protocol.

4. The method of claim 1, wherein said first signal is transmitted by a fixed node transceiver.

5. The method of claim 1, wherein said second transmitter is contained in a mobile transceiver node.

6. A method for determining the location of an object, comprising:
    associating a first transceiver with an object to be located, said first transceiver comprising a first transmitter and a first receiver operable to transmit and receive signals using a first transmission protocol and a second transmitter operable to transmit signals using a second transmission protocol;
    transmitting a first signal using said first transmission protocol;
    using said first receiver to receive said first signal;
    using said first transmitter to transmit a second signal using said first transmission protocol in response to receipt of said first signal, if said transceiver is outside transmission range of a node using said second transmission protocol;
    using said second transmitter to transmit a second signal using said second transmission protocol in response to receipt of said first signal, if said transceiver is within transmission range of a node using said second transmission protocol; and
    processing said second signal to determine the location of said object.

7. The method of claim 6, wherein said first transmission protocol is an IEEE 802.15.4 transmission protocol and said second transmission protocol is compliant with an Ultra Wide Band (UWB) protocol.

8. A method for determining the location of an object, comprising:
- defining a local locationing system comprising a plurality of transceivers, wherein each individual transceiver in said plurality of transceivers comprises a first transmitter and a first receiver operable to transmit and receive signals using a first transmission protocol and a second transmitter operable to transmit signals using a second transmission protocol;
- determining the location of a subset of individual transceivers in said plurality of transceivers in said local locationing system;
- communicating the location of said subset of individual transceivers to a transceiver outside said local locationing system; and
- using said transceiver outside said local locationing system to communicate the location of said subset of individual transceivers to a node.

9. The method of claim 8, wherein said first transmission protocol is an IEEE 802.15.4 transmission protocol.

10. The method of claim 8, wherein said second transmission protocol is compliant with an Ultra Wide Band (UWB) protocol.

11. The method of claim 8, wherein said subset of transceivers in said local locationing system comprises at least three individual transceivers.

12. The method of claim 8, wherein at least one of the individual transceivers in said subset of transceivers in said local locationing system is associated with an object and the location of the individual transceiver is used to determine the location of the object.

13. The method of claim 8, wherein the location of said subset of individual transceivers is communicated to said transceiver outside said local locationing system in response to a network request for positioning data.

14. The method of claim 8, wherein the location of said subset of individual transceivers is communicated to said transceiver outside said local locationing system in response to a beacon signal.

15. A system for determining the location of an object, comprising:
- a first transceiver associated with an object to be located, said first transceiver comprising a first transmitter and a first receiver operable to transmit and receive signals using a first transmission protocol and a second transmitter operable to transmit signals using a second transmission protocol;
- a second transceiver comprising a second receiver, wherein said second transceiver is operable to transmit a first signal using said first transmission protocol, wherein said first signal is received by said first receiver of said first transceiver and said second receiver is operable to receive a second signal of said second transmitter of said first transceiver using said second transmission protocol in said first transceiver's response to receipt of said first signal; and
- processing logic operable to use said second signal to determine the location of said object.

16. The system of claim 15, wherein said first transmission protocol is an IEEE 802.15.4 transmission protocol.

17. The system of claim 16, wherein said second transmission protocol is compliant with an Ultra Wide Band (UWB) protocol.

18. The system of claim 17, wherein said first signal is transmitted by a fixed node transceiver.

19. The system of claim 18, wherein said second transmitter is contained in a mobile transceiver node.

20. The system of claim 19, wherein said second transceiver also comprises a second transmitter operable to transmit signals using the second transmission protocol.

* * * * *